(12) United States Patent
Nishie et al.

(10) Patent No.: US 7,160,034 B2
(45) Date of Patent: Jan. 9, 2007

(54) OPTICAL TRANSMISSION AND RECEIVER MODULE

(75) Inventors: Mitsuaki Nishie, Osaka (JP); Hiromi Nakanishi, Osaka (JP); Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 301 days.

(21) Appl. No.: 10/806,689

(22) Filed: Mar. 23, 2004

(65) Prior Publication Data

US 2004/0234270 A1 Nov. 25, 2004

(30) Foreign Application Priority Data

Mar. 25, 2003 (JP) .............................. 2003-083198

(51) Int. Cl.
*G02B 6/42* (2006.01)

(52) U.S. Cl. .............................. 385/88; 385/92; 385/93; 385/94; 398/140; 398/141

(58) Field of Classification Search ................... 385/88
See application file for complete search history.

(56) References Cited

U.S. PATENT DOCUMENTS

| | | | | |
|---|---|---|---|---|
| 4,733,094 A | * | 3/1988 | Carpentier et al. ............ | 257/82 |
| 5,323,269 A | * | 6/1994 | Walker et al. ............... | 359/739 |
| 5,696,862 A | * | 12/1997 | Hauer et al. ................. | 385/88 |
| 5,771,218 A | * | 6/1998 | Feldman et al. .............. | 257/98 |
| 5,841,562 A | | 11/1998 | Rangwala et al. | |
| 6,314,223 B1 | * | 11/2001 | Te Kolste et al. ............ | 385/48 |
| 6,404,959 B1 | * | 6/2002 | Te Kolste et al. ............ | 385/48 |
| 6,591,043 B1 | * | 7/2003 | Te Kolste et al. ............ | 385/48 |
| 6,694,074 B1 | * | 2/2004 | Schunk ......................... | 385/33 |
| 6,730,940 B1 | * | 5/2004 | Steranka et al. .............. | 257/98 |
| 6,835,923 B1 | * | 12/2004 | Hamalainen et al. ......... | 385/31 |
| 6,856,717 B1 | * | 2/2005 | Kilian .......................... | 385/15 |
| 6,873,799 B1 | * | 3/2005 | Cohen et al. ............... | 398/135 |
| 6,881,980 B1 | * | 4/2005 | Ting ............................ | 257/81 |
| 6,939,058 B1 | * | 9/2005 | Gurevich et al. ............ | 385/93 |
| 6,969,946 B1 | * | 11/2005 | Steranka et al. .............. | 257/98 |
| 6,973,110 B1 | * | 12/2005 | Althaus et al. ............ | 372/50.1 |
| 2002/0196500 A1 | * | 12/2002 | Cohen et al. ................ | 359/152 |
| 2004/0071411 A1 | * | 4/2004 | Nakanishi et al. ........... | 385/92 |
| 2004/0190836 A1 | * | 9/2004 | Kilian .......................... | 385/92 |

FOREIGN PATENT DOCUMENTS

| | | |
|---|---|---|
| JP | 09-325248 | 12/1997 |
| JP | 10153720 | 6/1998 |
| JP | 2000-028850 | 1/2000 |
| JP | 2000-180671 | 6/2000 |
| JP | 2000-249875 | 9/2000 |
| JP | 2003-004991 | 1/2003 |

* cited by examiner

*Primary Examiner*—Frank G. Font
*Assistant Examiner*—James P. Hughes
(74) *Attorney, Agent, or Firm*—Fish & Richardson P.C.

(57) ABSTRACT

An optical transmission and receiver module suitable for a single-fiber bi-directional communication includes a light emitting device, a photodiode, an optical path routing element which allows light emitted from the light emitting device and light directed to the photodiode to pass through the element and which changes their optical paths, as required, and a lens transparent to both light emitted from light emitting device and light directed to the photodiode.

20 Claims, 5 Drawing Sheets

OPTICAL TRANSMISSION AND RECEIVER MODULE

BACKGROUND OF THE INVENTION

1. Field of the Invention

The present invention relates to optical transmission and receiver modules for use in optical communication. In particular, the present invention relates to an optical transmission and receiver module suitable for single-fiber bi-directional communication.

2. Description of the Related Art

An optical transmission and receiver module of the related art includes first and second packages accommodating a light emitting device and a light receiving device, respectively, and a third package accommodating an optical filter. The first and second packages includes a lens for a light-emitting device and a lens for a light-receiving device, respectively. Accordingly, the optical transmission and receiver module of the related art has many parts.

The optical transmission and receiver module of the related art is structured such that light from the light emitting device passes through the light-emitting-device lens and is incident on an optical fiber after passing through the optical filter, and light emitted from the optical fiber passes through the optical filter and is led to the light receiving device after passing through the light-receiving-device lens. In other words, the optical filter is disposed between the optical fiber and each lens. A specific example is described below.

FIG. 5 is a side sectional view showing a schematic section of a conventional optical transmission and receiver module 100. The optical transmission and receiver module 100 includes a laser diode 101 for emitting light which is to be incident on an optical fiber 200, a photodiode 102 for receiving light output from the optical fiber 200, and an optical filter 103 which allows the light from the laser diode 101 to pass through it and which reflects light to the photodiode 102 so as to changes the optical path. The laser diode 101 is mounted on a substrate 104 fixed to a package 105. The package 105 includes a lens 106 which opposes the laser diode 101 so that coupling between the light from the laser diode 101 and the optical fiber 200 is efficiently established. The photodiode 102 is fixed to a package 107 which is different from the package 105. As in the case of the package 105, the package 107 also includes a lens 108 which opposes the photodiode 102 so that light is efficiently coupled with the photodiode 102. Both packages 105 and 107 are separately fixed to another package 109 in which the optical fiber 200 and the optical filter 103 are held.

In this arrangement, light emitted from the laser diode 101 is converged by the lens 106, passes through the filter 103, and is incident on the optical fiber 200. Also, light emitted from the optical fiber 200 is reflected by the filter 103 so as to change its optical path, passes through the lens 108, and is received by the photodiode 102. This type of optical transmission and receiver module is disclosed in, for example, U.S. Pat. No. 5,841,562.

The conventional optical transmission and receiver module has a large number of parts. Accordingly, the module has a limitation in the reduction of its size, and it takes time to assemble the module. This causes a problem in that it is difficult to reduce the required cost.

As shown in FIG. 5, in the optical transmission and receiver module 100, the laser diode 101 and the photodiode 102 are separately accommodated in the packages 105 and 107, and the packages 105 and 107, and the optical filter 103 are further accommodated in the package 109 so as to be integrated. Thus, the optical transmission and receiver module 100 has a large number of parts. The packages 105 and 107 also have large numbers of parts since both respectively include the lenses 106 and 108.

After the laser diode 101 is accommodated in the package 105 and the photodiode 102 is accommodated in the package 107, the packages 105 and 107 are fixed to the package 109. Therefore, this requires a large number of production steps, and may cause high cost of production. Accordingly, improvement in productivity and economical efficiency is expected to be achieved.

In addition, due to the above large numbers of parts, it is difficult to reduce the size of the optical transmission and receiver module. In order to increase the number of users of an optical communication network so that wider-spread use of the optical fiber communication is enhanced, a small optical transmission and receiver module which has a less number of parts and which can be easily assembled at a low cost must be developed.

SUMMARY OF THE INVENTION

Accordingly, it is a main object of the present invention to provide a small optical transmission and receiver module which has a reduced number of parts and good productivity.

An optical transmission and receiver module according to an aspect of the present invention includes: at least one light emitting device for emitting light having a first wavelength to be incident on an optical transmission medium; at least one light receiving device for receiving light emitted from the optical transmission medium and having a second wavelength different from the first wavelength; an optical path routing element for converging an optical path of the first wavelength and an optical path of the second wavelength on the side of the optical transmission medium, and for separating an optical path of the first wavelength on the side of the light emitting device and an optical path of the second wavelength on the side of the light receiving device into the directions of the respective emitting device and light receiving device; and a lens transparent to both the first wavelength and the second wavelength and provided between the optical transmission medium and the optical path routing element.

In the present invention, the optical transmission medium is, for example, an optical fiber.

In the present invention, the light emitting device may be, for example, a semiconductor light emitting device, such as a semiconductor laser diode or light emitting diode made of GaAlAs material or InGaAsP material. In the present invention, the optical transmission and receiver module may include at least one light emitting device: in the case of a multichannel optical transmission and receiver module having a plurality of optical transmission media, the number of the light emitting devices may be adapted according to the number of the optical transmission media. The first wavelength may be 1.3 µm or 1.55 µm, for example.

In the present invention, the light receiving device may be a semiconductor device, such as a photodiode or an avalanche photodiode (APD) made of InGaAs material, InGaAsP material, Si, or Ge, for example. Specifically, in the case of a light receiving layer for a long-wavelength band such as a 1-µm wavelength band to 1.6-µm wavelength band, it is preferable that the light receiving device be formed of InGaAs material, InGaAsP material, or Ge. In the case of a light receiving layer for a shorter wavelength band, a light receiving device may be made of a material such as Si. Also, a front-illuminated type of light receiving device is preferable since it can be easily mounted. As many light receiving devices of this type as the light emitting devices may be provided. The second wavelength differs from the first wavelength and may be 1.3 µm or 1.55 µm, for example.

If the light emitting device and the light receiving device are separately inspected beforehand and only good devices are used, the yield increases as a whole and a loss due to defective ones can be reduced.

In the present invention, the optical path routing element has a Wavelength Division Multiplexing (WDM) filter function. Specifically, in order to lead light of the first-wavelength to the optical transmission medium and light of the second-wavelength to the light receiving device, respectively, the optical path routing element changes the optical path of at least either of the first-wavelength light and the second-wavelength light. In addition, an optical path of the first-wavelength light to be led to the lens and that of the second-wavelength light to be led to the light receiving device after passing through the lens are aligned with each other on the side of the optical transmission medium relative to the optical path routing element. In other words, the optical transmission and receiver module of the present invention is structured such that the optical axis of the first-wavelength light and the optical axis of the second-wavelength light are aligned with each other with respect to the lens and the optical path routing element and differ from each other with respect to each device and the optical path routing element.

Preferably, the optical path routing element includes a transmission-reflection part which allows either of the first-wavelength light and the second-wavelength light to pass through it and which reflects the other light, and a reflection part which reflects the other light. In particular, the transmission-reflection part and the reflection part may be separately formed and combined, or may be formed by forming a multilayer film on a single islet. In the former case, for example, a known WDM filter is used as the transmission-reflection part and a mirror is used as the reflection part, and they are attached to a single islet. In this case, the islet may be formed of transparent glass, for example, the WDM filter being attached to one side thereof and the mirror being attached to the other side. In the latter case, the islet may be made of transparent glass, for example, and films may be formed on the surface of the islet so as to be used as the transmission-reflection part and the reflection part. It is preferable that the material for the film be dielectric material. Specifically, the material includes low refractive index material, such as $SiO_2$ and $MgF_2$, and high refractive index material such as $Al_2O_3$ and $Ti_2O_5$. The transmission-reflection part may be formed as a multilayer film by performing known PVD and CVD using the above film material so that the transmission-reflection part has a WDM filter function. More specifically, a transmission-reflection part which allows light of a wavelength to pass through it and which reflects light of a different wavelength can be formed by stacking such a low-refractive-index film and high-refractive-index film alternately. The reflection part may be formed of a metal film by a known physical vapor deposition (PVD) or chemical vapor deposition (CVD) method using a metal such as Au or Al. This metal film is preferable since it has a high reflectance.

The optical path routing element may have a structure which allows first-wavelength light from a light emitting device to pass therethrough and which changes the optical path of second-wavelength light so as to direct the second-wavelength light to a light receiving device, or a structure which changes the optical path of the first-wavelength light so as to direct the first-wavelength light to a light transmission medium and which allows the second-wavelength light to pass through the optical path routing element so as to be led to the light receiving device. For example, if the optical path routing element includes the transmission-reflection part and the reflection part in an integrated form on the islet, in the former case, the transmission-reflection part allows only the first-wavelength light emitted from the light emitting device to pass through it, and conveys the second-wavelength light emitted from the optical transmission medium to the reflection part through the islet by reflecting the emitted second-wavelength light, and the reflection part changes an optical path of the second-wavelength light so that the second-wavelength light can be led to the light receiving device. In the latter case, the reflection part reflects the first-wavelength light emitted from the light emitting device so as to direct it to the transmission-reflection part through the islet, and the transmission-reflection part changes the optical path of the first-wavelength light by reflecting it so as to be led to the optical transmission medium and allows only the second-wavelength light emitted from the optical transmission medium to pass therethrough.

In the present invention, the lens enables light between the optical transmission medium and each device to be coupled. This type of lens is sufficient if it is transparent to the first-wavelength light and the second-wavelength light: it may be made of glass, for example, BK-7 or the like. The lens is disposed such that its central axis coaxially coincides with the optical axis of the optical transmission medium.

Preferably, the optical transmission and receiver module of the present invention further includes a pole for supporting the optical path routing element, a bench for mounting the pole, and a cap for covering the pole and the bench such that the light emitting device, the light receiving device, and the optical path routing element are accommodated therein, and the lens is provided in the cap such that the central axis of the lens coaxially coincides with the optical axis of the optical transmission medium. This arrangement eliminates the need to use a plurality of packages, such as a light-emitting-device package, a light-receiving-device package, and an optical-filter package, as in the related art. This arrangement only needs a single package, thus reducing the number of parts. Also, the use of a single package enables further size reduction. Moreover, the structure of the cap with the lens facilitates the package assembling.

It is preferable that the pole be made of metal such as iron (Fe), copper (Cu), or metal alloy such as copper-nickel alloy (Cu—Ni), stainless steel, or Fe—Co—Ni. The pole made of a metal allows the reduction of electric resistance and thereby a preferable ground can be obtained. Preferably, the pole is disposed on a bench (described later) in parallel to the optical axis of the optical transmission medium.

Preferably, the bench and the cap are made of metal material, such as iron (Fe), copper (Cu), or metal alloy such as copper-nickel alloy (Cu—Ni), or stainless, or Fe—Co—Ni. A metal package has good long-term stability since it is strong and enables hermetic sealing (complete sealing) and also has high radiation performance and a function of blocking external electromagnetic noise. In addition, a so-called coaxial package in which the central axis of the bench coaxially coincides with the optical axis of the optical transmission medium is preferable since its size can be effectively reduced. Commercially available so-called "CAN package" may be used. CAN type packages, which are commonly used for many purposes, are mass-produced and available at a relatively low price, enabling cost reduction. For example, a laser module of CAN type package for general use may be used. In this case, the design of the optical transmission and receiver module of the present invention can be simplified since it can be constituted by adding a light receiving device and an optical path routing element to the optical system of a standard laser module for general use. In the case of using the generally used CAN type package, the production cost can be reduced since existing assembly and inspection apparatuses can be used without substantial change because the size of the package is similar to that of conventional one.

The light emitting device may be directly mounted on the pole for supporting the optical path routing element, or the light emitting device may be mounted on the substrate and subsequently the substrate may be mounted on the pole. The substrate may be made of, for example, ceramic, such as alumina or zirconia, Si, Cu, or Cu—W.

The light receiving device may be directly mounted on the bench, or the light receiving device may be mounted on a substrate and subsequently the substrate may be mounted on the bench. The substrate on which the light receiving device is mounted may be made of ceramic such as zirconia or alumina, for example.

The optical path routing element is provided on the pole such that the pole is positioned between the light receiving device and the light emitting device. Arranging the pole between the light emitting device and the light receiving device is preferable since light from the light emitting device is thereby prevented from straying onto the light receiving device.

The optical transmission and receiver module of the present invention may further include a monitoring light receiving device capable of detecting the intensity of the first-wavelength light emitted from the light emitting device. A light receiving device for monitoring light may be similar to the above-mentioned light receiving device. It is preferable that the monitoring light receiving device be mounted in the vicinity of the light emitting device, for example, at a rear position in a direction in which the first-wavelength light travels. The monitoring light receiving device may be directly mounted on the bench.

The optical transmission and receiver module of the present invention may further include an amplifier for amplifying the output of an electric signal from the light receiving device. The amplifier may be made of an integrated circuit, such as an Si—IC or GaAs—IC. Preferably, the amplifier is directly mounted on the bench by performing bonding using an electrically conductive epoxy resin or the like such that the amplifier is accommodated in the cap so that the module can be further downsized. Also, it is preferable for the amplifier to be mounted in the vicinity of the light receiving device because a wire connection, such as a metal wire of gold (Au) or aluminum (Al), which connects the light receiving device and the amplifier can be shortened, and resistance against noise can be enhanced.

The optical transmission and receiver module of the present invention may have a so-called "receptacle structure", including a coupling part capable of coupling with an external unit: thereby each device and the optical transmission medium can be optically coupled together. The coupling part may include, for example, a ferrule with an optical fiber and a sleeve for holding the ferrule. The ferrule may have a double structure: an inner sleeve disposed on the side of the ferrule may be made of a ceramic material such as zirconia, and an outer sleeve is made of stainless steel or a like material having high strength.

According to the present invention, by using a common lens for a light emitting device and a light receiving device, a reduction in the number of part is achieved. The use of the common lens can shorten the distance between the light emitting device and the light receiving device, thus enabling size reduction. Accordingly, an optical transmission and receiver module of the present invention is suitable for use in single-fiber bi-directional communications using at least one optical fiber for two-direction communications.

DESCRIPTION OF THE PREFERRED EMBODIMENTS

Figure 1:
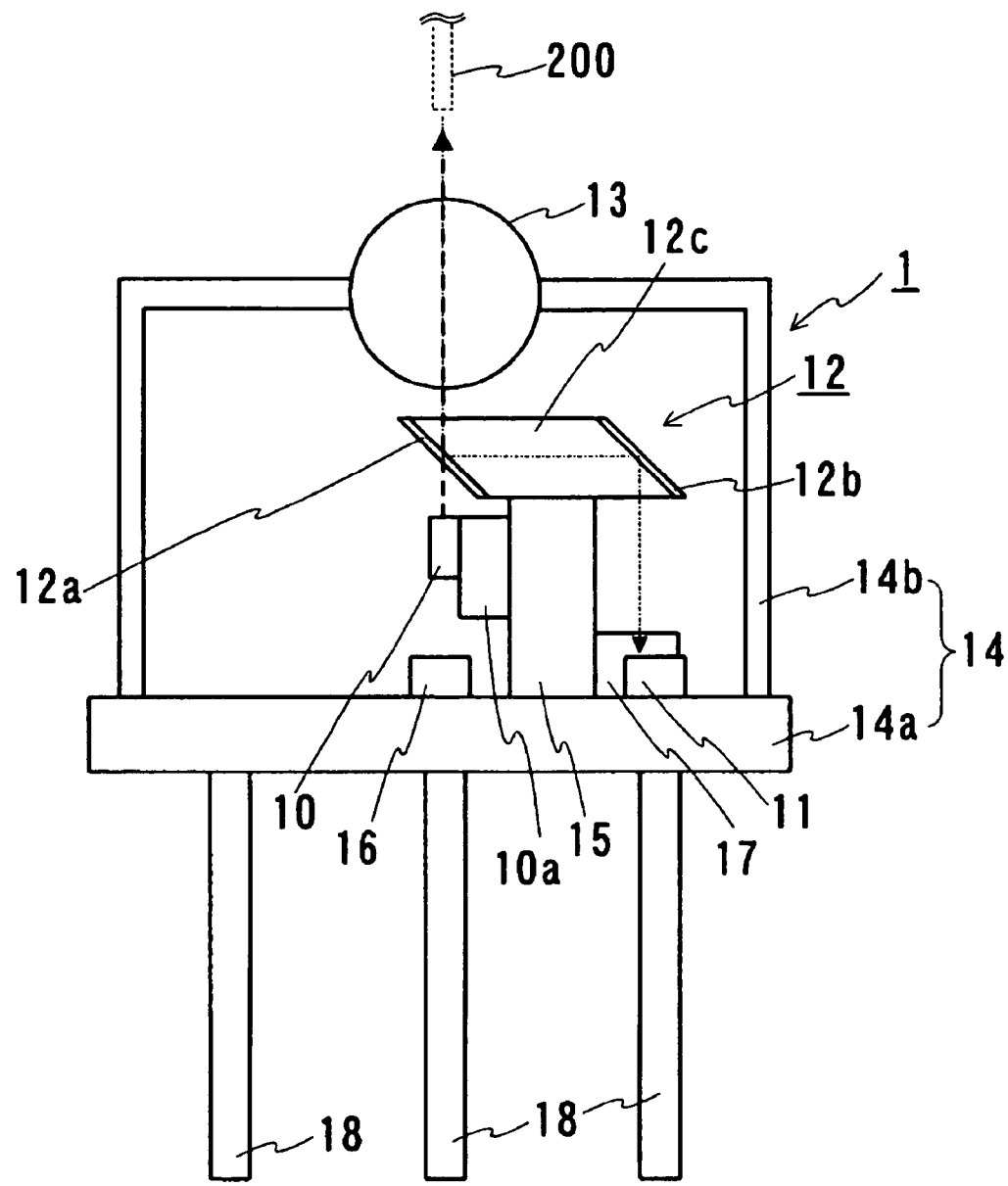
FIG. 1 is a schematic view showing an example of an optical transmission and receiver module of the present invention, which includes an optical path routing element having a transmission-reflection part which allows light of a first wavelength to pass through it and which reflects light of a second wavelength.

Embodiments of the present invention are described below with reference to the accompanying drawings. By using identical reference numerals to denote identical elements in the embodiments, a repeated description is omitted.

EXAMPLE 1

FIG. 1 is a schematic view showing an example of an optical transmission and receiver module 1 of the present invention. The optical transmission and receiver module 1 can perform two-way communication by using a single optical fiber.

In the optical transmission and receiver module 1, a transmission-reflection part in an optical path routing element allows first-wavelength light from a light emitting device to pass through it and reflects second-wavelength light to a light receiving device. The optical transmission and receiver module 1 includes a laser diode 10, a photodiode 11, an optical path routing element 12 which allows light from the laser diode 10 and light to the photodiode 11 to pass through it as needed and which performs optical routing, and a lens 13 which allows both light from the laser diode 10 and light to the photodiode 11 to pass therethrough. These parts are further described below.

The laser diode 10 emits first-wavelength light which is to be incident on an optical fiber 200. In Example 1, the laser diode 10 was made of an InGaAsP based material, and a first wavelength was 1.3 μm. In the example, the laser diode 10 was mounted on a substrate 10a made of alumina. The photodiode 11 receives second-wavelength light which differs in wavelength from the first-wavelength light and which is emitted from the optical fiber 200. In the example, a front-illuminated type photodiode made of an InGaAs based material was used as the photodiode 11, and a second wavelength was 1.55 μm. In the example, the laser diode 10 and the photodiode 11 which were each proved to be in good condition by a pre-inspection were used, resulting in the decrease of loss due to defects as a whole. This applies to Example 2 of the present invention, which will be described later. The lens 13 is transparent to the first-wavelength light and the second-wavelength light and is provided such that the first-wavelength light from the laser diode 10 can be efficiently coupled with the optical fiber 200 and the second-wavelength light from the optical fiber 200 can be efficiently coupled with the photodiode 11. The lens 13 was made of glass and transparent to light having a wavelength of 1.3 μm and light having a wavelength of 1.55 μm. As shown in FIG. 1, the lens 13 is disposed between the optical fiber 200 and the optical path routing element 12.

The optical path routing element 12 includes a transmission-reflection part 12a which allows the first-wavelength light from the laser diode 10 to pass through it and which reflects the second-wavelength light from the optical fiber 200, a reflection part 12b which performs optical routing so that the reflected second-wavelength light is further reflected and led to the photodiode 11, an islet 12c provided with the transmission-reflection part 12a and the reflection part 12b. In the example, the islet 12c was made of transparent glass, and the transmission-reflection part 12a and the reflection part 12b are provided on its opposite ends, respectively. The transmission-reflection part 12a was made of a multilayer film formed on the islet 12c by plasma chemical vapor deposition P-CVD) using dielectric materials, $SiO_2$ and $Ti_2O_5$. The reflection part 12b was made of an Au film formed by vapor deposition on the islet 12c.

In the optical transmission and receiver module 1, the laser diode 10, the optical path routing element 12, and the lens 13 are disposed such that the first-wavelength light emitted from the laser diode 10 passes through the transmission-reflection part 12a of the optical path routing element 12 and then passes through the lens 13 so as to be incident on the optical fiber 200. Also, the photodiode 11, the optical path routing element 12, and the lens 13 are disposed such that the second-wavelength light emitted from the optical fiber 200 passes through the lens 13 and is reflected by the transmission-reflection part 12a of the optical path routing element 12 so as to change its optical path and penetrate the islet 12c and is further reflected by the reflection part 12b so as to be incident on the photodiode 11. In other words, the laser diode 10, the photodiode 11, the optical path routing element 12, and the lens 13 are disposed such that the optical path of the first-wavelength light and the optical path of the second-wavelength light between the optical fiber 200 and the optical path routing element 12 can converge on the optical axis of the optical fiber 200 and such that the optical path of the first-wavelength light between the optical path routing element 12 and the laser diode 10 and the optical path of the second-wavelength light between the optical path routing element 12 and the photodiode 11 are separated in the directions of the laser diode 10 and the photodiode 11, respectively.

In the example, the laser diode 10, the photodiode 11, and the optical path routing element 12 were accommodated in a single package 14. The package 14 includes a bench 14a and a cap 14b which covers the bench 14a so as to accommodate the laser diode 10, the photodiode 11, and the optical path routing element 12 therein. The cap 14b is provided with the lens 13 such that the central axis of the lens 13 is coincident coaxially with the optical axis of the optical fiber 200. In the example, a CAN package laser module for multipurpose in which a bench and cap are made of iron (Fe) was used. Accordingly, the optical transmission and receiver module 1 in the example was made by adding at least the photodiode 11 and the optical path routing element 12 to the multipurpose laser module. As described above, by using the laser module for multipurpose, the optical transmission and receiver module 1 can be easily assembled and the required production cost can be reduced. In addition, a conventional assembling apparatus and inspection apparatus can also be used without being changed.

In the example, the photodiode 11 was not mounted on the substrate but was directly mounted on the bench 14a. The bench 14a was provided with an iron pole 15 such that the pole 15 was perpendicular to the mounted surface of the photodiode 11, that is, in parallel to the optical axis of the optical fiber 200. The optical path routing element 12 was provided on one end of the pole 15 (the upper side in FIG. 1), and the laser diode 10 mounted on a substrate 10a was provided on the opposite side face (left side in FIG. 1) of the pole 15 relative to the photodiode 11. In other words, the pole 15 is disposed between the laser diode 10 and the photodiode 11. This arrangement is advantageous for preventing the first-wavelength light emitted from the laser diode 10 from straying to the photodiode 11.

Moreover, in the example, a monitoring photodiode 16 that can detect the intensity of the first-wavelength light emitted from the laser diode 10 and an amplifier 17 for amplifying an electric signal output from the photodiode 11 were provided on the bench 14a. The monitoring photodiode 16 was similar to the photodiode 11, that is, a front-illuminated type photodiode made of an InGaAs based material. The monitoring photodiode 16 was mounted below the laser diode 10 as shown in FIG. 1.

The amplifier 17 was of an Si—IC type, and was disposed in the vicinity of the photodiode 11 so as to shorten a wire connection therebetween and to lessen a noise effect. The amplifier 17 was bonded onto the bench 14a with an electrically conductive epoxy resin.

The bench 14a was provided with a required number of lead pins 18 inserted therein for supplying power and leading out an electric signal. In the example, five lead pins 18 were inserted and were connected to the laser diode 10, the photodiode 11, the monitoring photodiode 16, and the amplifier 17 by Au wires (not shown), as required.

The above arrangement allows the downsizing of the optical transmission and receiver module by reducing the number of lenses compared with a conventional optical transmission and receiver module and by reducing the distances between the lens, the optical path routing element, and the laser diode 10 (photodiode 11). Also, by accommodating the laser diode 10, the photodiode 11, and the optical path routing element 12 in one package, the size of the optical transmission and receiver module 1 can be further reduced. In addition, reducing the number of parts results in the increase of productivity and the reduction of production cost.

EXAMPLE 2

Figure 2:
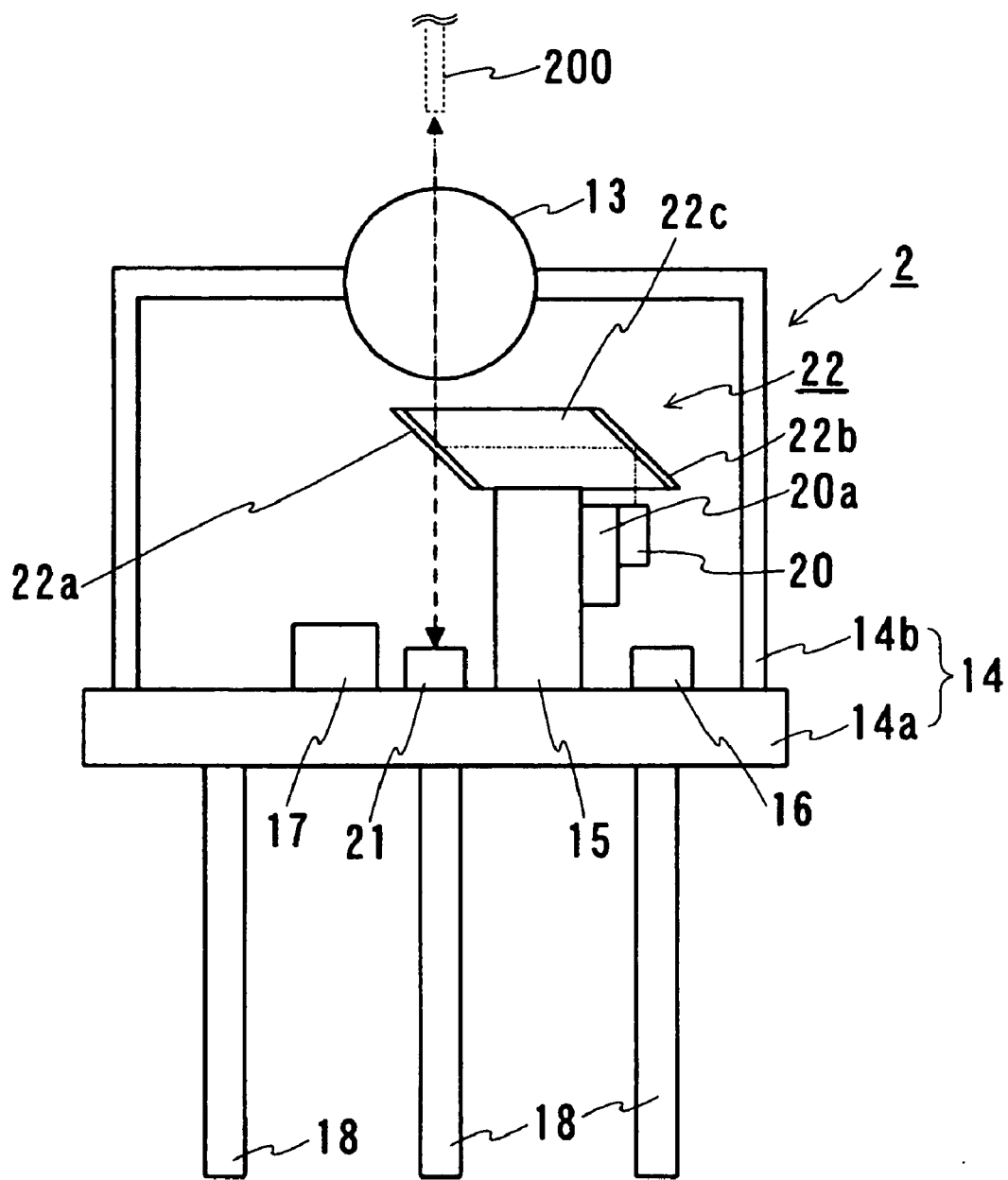
FIG. 2 is a schematic view showing another example of an optical transmission and receiver module of the present invention, which includes an optical path routing element provided with a transmission-reflection part which reflects light of a first wavelength and which allows light of a second wavelength to pass through it.

FIG. 2 is a schematic view showing an example of an optical transmission and receiver module 2 for two-way communications using a single optical fiber. In the optical transmission and receiver module 2, a transmission-reflection part in an optical path routing element reflects first-wavelength light and allows second-wavelength light to pass through it to a light receiving device. Parts identical to those shown in FIG. 1 are denoted by identical reference numerals. The optical transmission and receiver module 2 is similar in basic structure to the optical transmission and receiver module 1 shown in FIG. 1 and is provided with a laser diode 20, a photodiode 21, an optical path routing element 22, which allows light emitted from the laser diode 20 and light directed to the photodiode 21 to pass therethrough or change their optical paths as required, and a lens 13 which allows both light emitted from the photodiode 21 and light directed to the photodiode 21 to pass through it. Example 2 differs from Example 1 in that light which passes through a transmission-reflection part 22b of the optical path routing element 22 is not light of a first wavelength but light of a second wavelength, and that light reflected by the transmission-reflection part 22b is not second-wavelength light but first-wavelength light. These differences are mainly described below.

In Example 2, the laser diode 20 was made of an InGaAsP based material and the first wavelength was 1.5 µm. The laser diode 20 was mounted on a substrate 20a made of silicon. The photodiode 21 was of a front-illuminated type made of InGaAs, and the second wavelength was 1.3 µm.

The optical path routing element 22 is constituted by the transmission-reflection part 22a, the reflection part 22b, and an islet 22c. The reflection part 22b changes the optical path of the first-wavelength light emitted from the laser diode 20. The transmission-reflection part 22a allows second-wavelength light emitted from the optical fiber 200 and directed to the photodiode 21 to pass therethrough and reflects the first-wavelength light reflected at the reflection part 22b so as to change its optical path to be led to the optical fiber 200. As in Example 1, the islet 22c was made of transparent glass and the transmission-reflection part 22a and the reflection part 22b were disposed at the opposite ends of the islet 22c, respectively. The transmission-reflection part 22a was made of a multilayer film formed on the islet 22c by the P-CVD method using dielectric materials, $SiO_2$ and $Ti_2O_5$. The reflection part 22b was made of an Au film formed by a vapor deposition on the islet 22c.

In the optical transmission and receiver module 2, the laser diode 20, the optical path routing element 22, and the lens 13 were disposed such that the optical path of the first-wavelength light emitted from the laser diode 20 could be changed by reflection at the reflection part 22b of the optical path routing element 22 so as to penetrate the islet 22c to be further reflected at the transmission-reflection part 22a and incident on the optical fiber 200. Also, the photodiode 21, the optical path routing element 22, and the lens 13 were disposed such that the second-wavelength light emitted from the optical fiber 200 passed through the lens 13 and the transmission-reflection part 22a so as to be incident on the photodiode 21.

In the above arrangement, as in Example 1, the optical transmission and receiver module 2 has a small number of parts as a result of reducing the number of lens as compared with a conventional optical transmission and receiver module, and distances between the disposed lens 13, optical path routing element 22, and laser diode 20 can be reduced, which permits further downsizing. Also, by accommodating the laser diode 20, the photodiode 21, and the optical path routing element 22 in a single package, the optical transmission and receiver module 2 has a reduced size. Moreover, a reduction in the number of parts realizes an increase in productivity and a reduction in production cost.

EXAMPLE 3

Figure 3:
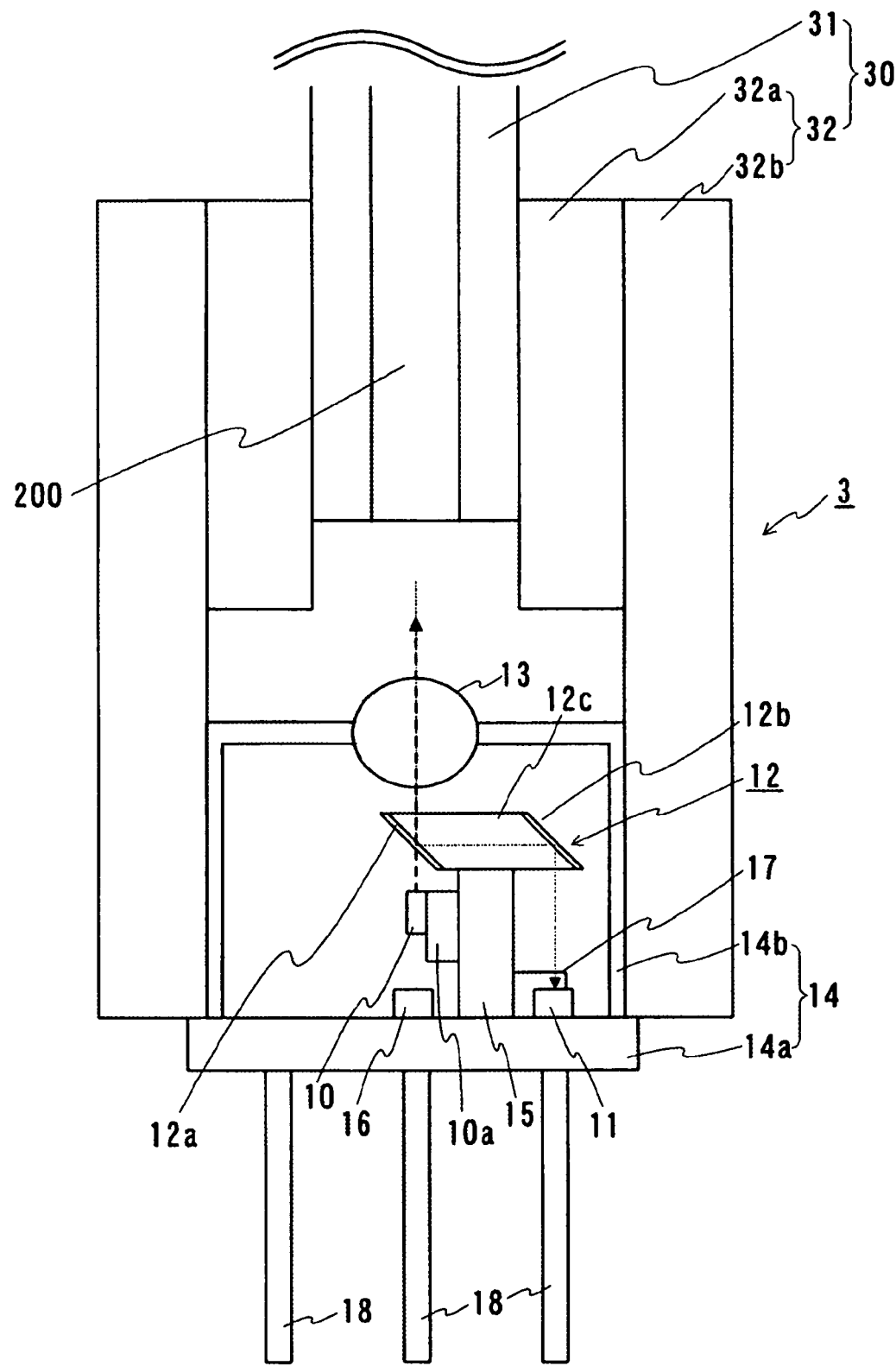
FIG. 3 is a schematic view showing an example of an optical transmission and receiver module of the present invention, which includes a coupling part for optical coupling with an exterior unit.

FIG. 3 is a schematic view showing an example of an optical transmission and receiver module 3 of the present invention, which includes a coupling part 30 in addition to the component parts shown in FIG. 1. In the optical transmission and receiver module 3, parts identical to those shown in FIG. 1 are denoted by identical reference numerals. The optical transmission and receiver module 3 of Example 3 is obtained by adding the coupling part 30 to the parts having basically similar structure to the optical transmission and receiver module 1 of Example 1 (shown in FIG. 1). The coupling part 30 is mainly described below.

The structure shown in FIG. 3 facilitates coupling with an external optical fiber, and is generally called the "receptacle structure". The coupling part 30 includes a ferrule 31 with an optical fiber, and a sleeve 32 for holding the ferrule 31. The ferrule 31 includes an optical fiber 200 in the center and is of a multipurpose type. The sleeve 32 has a double configuration constituted by an inner sleeve 32a disposed on the side of the ferrule 31, and an outer sleeve 32b disposed at the periphery of the inner sleeve 32a. The inner sleeve 32a is made of zirconia, and the outer sleeve 32b is made of stainless steel.

The optical transmission and receiver module 3 includes the coupling part 30 for optical coupling with the exterior, whereby the optical transmission and receiver module 3 is easily usable for communication.

EXAMPLE 4

In Examples 1 to 3 described above, only one each of a light emitting device and a light receiving device was provided. In Example 4, a plurality of light emitting devices and light receiving devices are included as described below.

Figure 4:
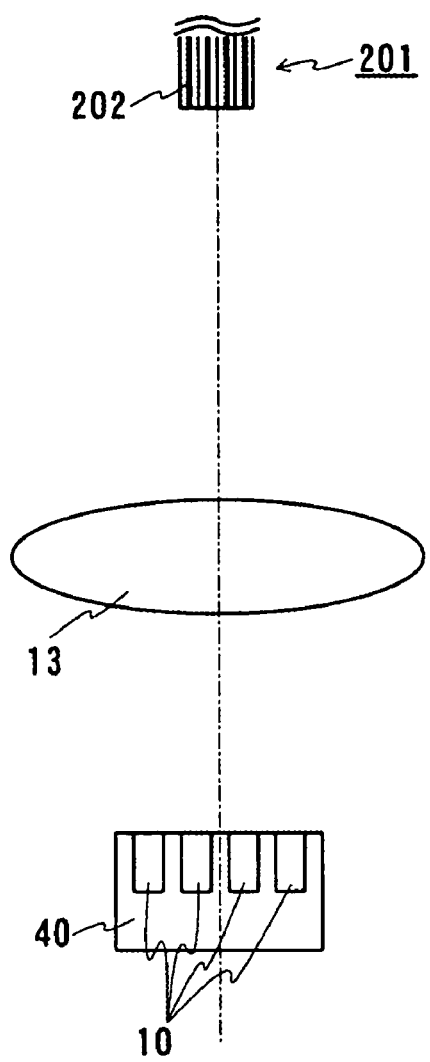
FIG. 4A is a schematic view illustrating a positional relationship among an optical fiber ribbon, a lens, and light emitting devices in an optical transmission and receiver module of the present invention which includes a plurality of light emitting devices and a plurality of light receiving devices.
FIG. 4B is a schematic view illustrating a positional relationship among the optical fiber ribbon, the lens, and the light emitting devices.
Figure 4:
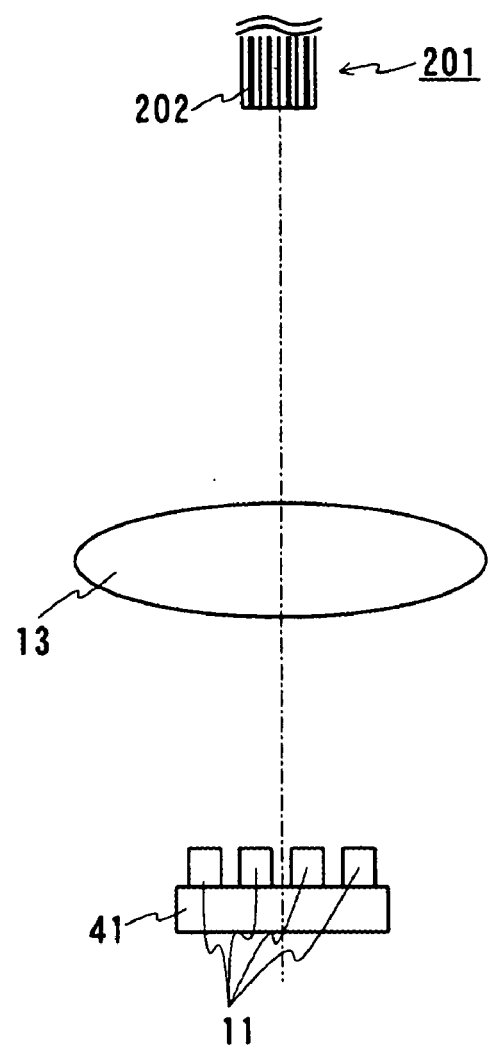
Figure 5:
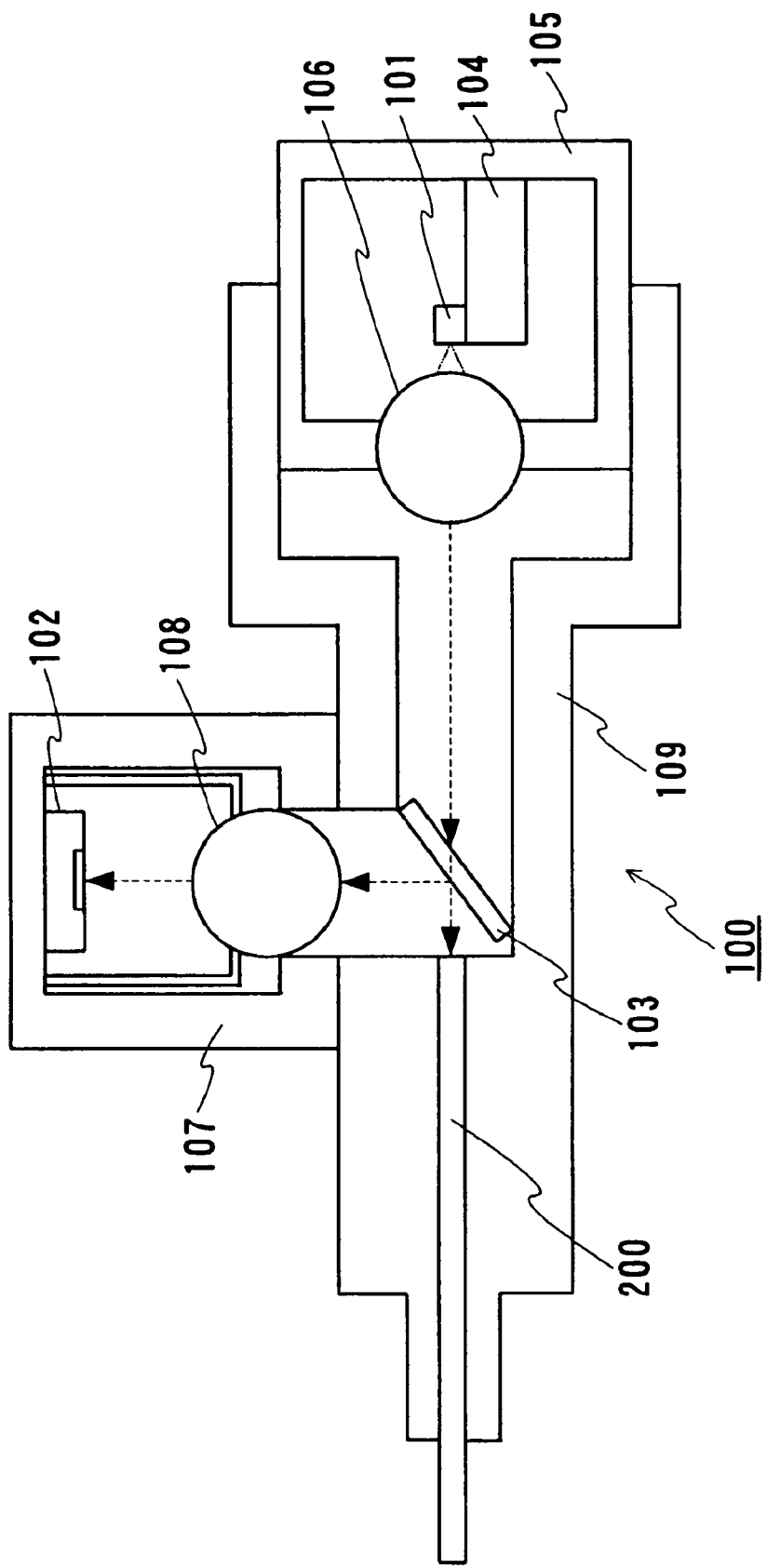
FIG. 5 is a schematic side sectional view showing a section of a conventional optical transmission and receiver module.

FIGS. 4A and 4B are schematic diagrams each showing an arrangement of a device, a lens, and an optical fiber in an optical transmission and receiver module of the present invention which includes light emitting devices and light receiving devices: FIG. 4A shows an arrangement of the light emitting devices, and FIG. 4B shows an arrangement of the light receiving devices. Parts identical to those shown in FIG. 1 are denoted by identical reference numerals. This optical transmission and receiver module of the present invention can be formed as a multichannel module for a fiber ribbon having a plurality of optical fibers. Such optical transmission and receiver module may include a plurality of laser diode 10 and a plurality of photodiodes 11 in a structure basically similar to an optical transmission and receiver modules 1 and 2 of Examples 1 and 2.

By way of example, as shown in FIGS. 4A and 4B, in the case of coping with a four-channel optical fiber ribbon 201, in order that each of optical fibers 202 may perform single-fiber bi-directional communication, one laser diode 10 and one photodiode 11 are provided for each optical fiber 202, that is, four laser diodes 10 and four photodiodes 11 are provided. As shown in FIG. 4A, four laser diodes 10 are mounted at equal intervals on a laser diode sub-mount 40, and as shown in FIG. 4B, four photodiodes 11 are mounted at equal intervals on a photodiode sub-mount 41. For example, when an inter-fiber pitch of the four-channel optical fiber ribbon 201 is approximately 250 μm and chips having dimensions of 350 μm by 350 μm are used as the laser diodes 10 and the photodiodes 11, the laser diodes 10 and the photodiodes 11 can be disposed on the sub-mounts 40 and 41 at a pitch of 500 μm (an intercentral distance between adjacent laser diodes 10 (photodiodes 11)), respectively. The sub-mounts 40 and 41 on which the laser diodes 10 and the photodiodes 11 are mounted are mounted on a pole and a bench, respectively. In this case, by using a lens 13 having a diameter of approximately 1.5 mm, optical coupling among the four-channel optical fiber ribbon 201, the laser diodes 10, and the photodiodes 11 can be established as shown in FIGS. 4A and 4B.

Thus, the optical transmission and receiver module of the present invention can be structured such that a plurality of light emitting devices and a plurality of light receiving devices are accommodated in a single package, constituting a multichannel optical transmission and receiver module. In such case, although FIGS. 4A and 4B show the structure of Example 1 as a basic structure, the structure in Example 2 may be adopted.

As described above, the optical transmission and receiver module of the present invention in which the number of parts is reduced is particularly advantageous in terms of downsizing and superior productivity in the case of performing single-fiber bi-directional communications. Therefore, it is expected that the optical transmission and receiver module of the present invention will be effective for promoting wide-spread use of optical communication, increasing the number of users in optical communication networks.

What is claimed is:

1. An optical transmission and receiver module comprising:
    at least one light emitting device for emitting light having a first wavelength which is to be incident on an optical transmission medium;
    at least one light receiving device for receiving light emitted from said optical transmission medium and having a second wavelength different from the first wavelength;
    an optical path routing element for converging the optical path of light having the first wavelength and the optical path of light having the second wavelength on the optical transmission medium side and for separating the optical path of light having the first wavelength on the side of said at least one light emitting device and the optical path of light having the second wavelength on the side of said at least one light receiving device in the directions of said at least one light emitting device and said at least one light receiving device, respectively;
    a lens transparent to both of light having the first wavelength and light having the second wavelength, the lens being provided between said optical transmission medium and said optical path routing element;
    a pole for supporting the optical path routing element; and
    a bench for mounting the pole;
    wherein the pole is disposed in a space between the at least one light emitting device and the at least one light receiving device.

2. An optical transmission and receiver module according to claim 1, wherein the number of the light receiving devices is equal to the number of the light emitting devices.

3. An optical transmission and receiver module according to claim 1, wherein said optical path routing element comprises a transmission-reflection part which allows either of light having the first wavelength and light having the second wavelength to pass through said transmission-reflection part and which reflects the other light, and a reflection part which reflects said other light.

4. An optical transmission and receiver module according to claim 3, wherein said transmission-reflection part is provided with a multilayer film made of a dielectric material.

5. An optical transmission and receiver module according to claim 1, wherein said optical path routing element allows light of the first wavelength emitted from said at least one light emitting device to pass through said optical path routing element, and changes the optical path of light having the second wavelength so as to be led to said at least one light receiving device.

6. An optical transmission and receiver module according to claim 1, wherein said optical path routing element changes the optical path of light having the first wavelength emitted from said at least one light emitting device so as to be led to said optical transmission medium, and allows light having the second wavelength input to said at least one light receiving device to pass through said optical path routing element.

7. An optical transmission and receiver module according to claim 1, further comprising a monitoring light receiving device.

8. An optical transmission and receiver module according to claim 1, further comprising an amplifier for amplifying the output of said at least one light receiving device.

9. An optical transmission and receiver module according to claim 1, further comprising a cap for covering said pole and said bench such that said at least one light emitting device, said at least one light receiving device, and said optical path routing element are accommodated therein,
    wherein said lens is provided in said cap such that the central axis of said lens coaxially coincides with the optical axis of said optical transmission medium.

10. An optical transmission and receiver module according to claim 3, further comprising a cap for covering said pole and said bench such that said at least one light emitting device, said at least one light receiving device, and said optical path routing element are accommodated therein,
    wherein said lens is provided in said cap so that the central axis of said lens coaxially coincides with the optical axis of said optical transmission medium.

11. An optical transmission and receiver module according to claim 5, further comprising a cap for covering said pole and said bench such that said at least one light emitting device, said at least one light receiving device, and said optical path routing element are accommodated therein,
    wherein said lens is provided in said cap so that the central axis of said lens coaxially coincides with the optical axis of said optical transmission medium.

12. An optical transmission and receiver module according to claim 6, further comprising a cap for covering said pole and said mounting part such that said at least one light emitting device, said at least one light receiving device, and said optical path routing element are accommodated therein,
    wherein said lens is provided in said cap so that the central axis of said lens coaxially coincides with the optical axis of said optical transmission medium.

13. An optical transmission and receiver module according to claim 1, further comprising a coupling part capable of establishing optical coupling with an exterior unit, wherein said coupling part comprises a ferrule with an optical fiber, and a sleeve for holding said ferrule.

14. An optical transmission and receiver module according to claim 3, further comprising a coupling part for establishing optical coupling with an exterior unit, wherein said coupling part comprises a ferrule with an optical fiber, and a sleeve for holding said ferrule.

15. An optical transmission and receiver module according to claim 5, further comprising a coupling part for establishing optical coupling with an exterior unit, wherein said coupling part comprises a ferrule with an optical fiber, and a sleeve for holding said ferrule.

16. An optical transmission and receiver module according to claim 6, further comprising a coupling part for establishing optical coupling with an exterior unit, wherein said coupling part comprises a ferrule with an optical fiber, and a sleeve for holding said ferrule.

17. An optical transmission and receiver module according to claim 9, further comprising a coupling part for establishing optical with an exterior unit, wherein said coupling part comprises a ferrule with an optical fiber, and a sleeve for holding said ferrule.

18. An optical transmission and receiver module according to claim 10, further comprising a coupling part for establishing optical coupling with an exterior unit, wherein said coupling part comprises a ferrule with an optical fiber, and a sleeve for holding said ferrule.

19. An optical transmission and receiver module according to claim 11, further comprising a coupling part for establishing optical coupling with an exterior unit, wherein said coupling part comprises a ferrule with an optical fiber, and a sleeve for holding said ferrule.

20. An optical transmission and receiver module according to claim 12, further comprising a coupling part for establishing optical coupling with an exterior unit, wherein said coupling part comprises a ferrule with an optical fiber, and a sleeve or holding said ferrule.

* * * * *